United States Patent
Uehara et al.

(10) Patent No.: US 9,583,225 B2
(45) Date of Patent: Feb. 28, 2017

(54) LASER IRRADIATION APPARATUS AND LASER MACHINING METHOD

(75) Inventors: Takuya Uehara, Kanagawa (JP); Itaru Chida, Kanagawa (JP); Hiroyuki Miyasaka, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1142 days.

(21) Appl. No.: 13/404,608

(22) Filed: Feb. 24, 2012

(65) Prior Publication Data

US 2012/0205349 A1 Aug. 16, 2012

Related U.S. Application Data

(63) Continuation-in-part of application No. PCT/JP2010/005142, filed on Aug. 20, 2010.

(30) Foreign Application Priority Data

Aug. 25, 2009 (JP) .................. 2009-194840

(51) Int. Cl.
*B23K 26/00* (2014.01)
*G21C 17/017* (2006.01)
(Continued)

(52) U.S. Cl.
CPC .......... *G21C 17/017* (2013.01); *B23K 26/122* (2013.01); *B23K 26/128* (2013.01);
(Continued)

(58) Field of Classification Search
CPC ............... B23K 26/121; B23K 26/128; B23K 26/1417; B23K 26/423; B23K 26/36; B23K 26/122; B23K 26/146; B23K 26/703; H01S 3/005; H01S 3/025; H01S 3/0407; G21C 17/017; G21C 19/207
See application file for complete search history.

(56) References Cited

U.S. PATENT DOCUMENTS 3,588,737 A * 6/1971 Chow ..................... H01S 3/139
372/29.02
6,163,012 A * 12/2000 Kimura et al. .......... 219/121.78
(Continued)

FOREIGN PATENT DOCUMENTS

EP   1 742 049 A2   1/2007
JP   64-087713 A    3/1989
(Continued)

OTHER PUBLICATIONS

Translation of International Preliminary Report on Patentability of PCT/JP2010/005142, dated Mar. 22, 2012, 6 pages.
European Patent Office extended search report of application 10811478.6 dated Dec. 15, 2014; 7 pages.

*Primary Examiner* — David Angwin
*Assistant Examiner* — Amit K Singh
(74) *Attorney, Agent, or Firm* — Foley & Lardner LLP

(57) ABSTRACT

A laser irradiation apparatus which is provided with: an environment isolation container, which houses a laser oscillator and is disposed in water; a laser irradiation head, which collects laser beams and irradiates a part to be machined with the laser beams; a light guide section which transmits the laser beams from the laser oscillator to the laser irradiation head; a power supply apparatus which supplies the laser oscillator with power; a cooling water supplying apparatus, which supplies the laser oscillator with cooling water through a cooling water supplying path; and a temperature sensor which measures the temperature inside of the environment isolation container. The temperature and/or the flow quantity of the cooling water to be supplied from the cooling water supplying apparatus is controlled on the basis of the measurement results obtained from the temperature sensor.

3 Claims, 10 Drawing Sheets

(51) Int. Cl.
*B23K 26/12* (2014.01)
*G21C 19/20* (2006.01)
*G21C 17/01* (2006.01)
*H01S 3/00* (2006.01)
*H01S 3/02* (2006.01)
*H01S 3/04* (2006.01)

(52) U.S. Cl.
CPC .......... *B23K 26/146* (2015.10); *B23K 26/703* (2015.10); *G21C 19/207* (2013.01); *G21C 17/01* (2013.01); *H01S 3/005* (2013.01); *H01S 3/025* (2013.01); *H01S 3/0407* (2013.01)

(56) References Cited

U.S. PATENT DOCUMENTS

| | | |
|---|---|---|
| 6,621,838 B2 * | 9/2003 | Naito et al. ...................... 372/34 |
| 7,432,471 B2 | 10/2008 | Yamazaki et al. |
| 7,532,652 B2 * | 5/2009 | Vetrovec ........................ 372/34 |
| 2002/0122525 A1 * | 9/2002 | Rosenberger .......... G21C 19/07 376/272 |
| 2005/0263505 A1 | 12/2005 | Yamazaki et al. |

FOREIGN PATENT DOCUMENTS

| | | |
|---|---|---|
| JP | 08-288571 A | 11/1996 |
| JP | 2004-259954 A | 9/2004 |
| JP | 2005-227218 A | 8/2005 |
| JP | 2005-334951 A | 12/2005 |

\* cited by examiner

LASER IRRADIATION APPARATUS AND LASER MACHINING METHOD

CROSS-REFERENCE TO RELATED APPLICATIONS

This application is a continuation-in-part (CIP) application based upon the International Application PCT/JP2010/005142, the International Filing Date of which is Aug. 20, 2010, and claims the benefit of priority from the prior Japanese Patent Application No. 2009-194840, filed in the Japanese Patent Office on Aug. 25, 2009.

FIELD

Embodiments described herein relate to a laser irradiation apparatus that performs machining in deep water environments, such as the bottom part of a reactor filled with reactor water, and also a laser machining method.

BACKGROUND

Laser light has been used in various fields due to its high energy density and high coherence property, and a laser application technology has been used as an inspection tool, a preventive maintenance tool, and a repairing tool in the field of maintenance of a rector in a nuclear power plant. Examples of the laser application technology include laser deposit welding for repairing cracks in a structure and laser peening for preventing stress corrosion crack of structure in the reactor vessel.

The laser peening is a preventive maintenance technology using Nd:YAG (neodymium:yttrium-aluminum-garnet) laser. Laser light is collected using a lens and the like and irradiated onto the surface of a material to generate a plasma, and a compressive residual stress is applied to the material by a plasma shock wave. The stress corrosion crack occurs when the following three conditions are met: material condition, environment condition, and stress condition. However, by removing a stress condition (tensile residual stress) using the laser peening, occurrence of the stress corrosion crack in the vicinity of a welding part can be prevented.

In the case where the laser peening is applied to a structure in the reactor, a laser oscillator is disposed on an operation floor to transmit laser light to a laser irradiation head installed in the bottom part of the reactor. Examples of a means for transmitting the laser light include one that transmits the light using a mirror provided inside a hollow light guide tube and one that transmits the light using an optical fiber.

In the case of the mirror transmission system, pulse energy that can be transmitted to a machining target is sufficiently large. However, as the transmission distance is increased, the size of the apparatus is increased correspondingly. In the case where the laser light is transmitted from the operation floor to the bottom part of the reactor, the transmission distance roughly reaches up to 40 m, which correspondingly increases the size of the apparatus for mirror transmission and requires taking the influence due to vibration of a light guide path into consideration. On the other hand, in the case of the optical fiber transmission system, simple connection of the laser oscillator and laser irradiation head by an optical fiber allows laser light transmission. Thus, the size of the apparatus need not be made large even when the transmission distance is increased, so that the influence due to vibration of a light guide path can be ignored. However, there may be a case where the optical fiber is damaged by the laser light, so that a system for monitoring the damage of the optical fiber is required. Further, the energy density of the laser that can be transmitted using the optical fiber transmission system is smaller than that in case of the mirror transmission system.

As another means for applying the laser peening to a structure in the reactor, there is known an apparatus that includes, in the reactor, a watertight vessel housing a laser oscillator and uses a mirror to transmit the laser light from the laser oscillator to a laser irradiation head. Such an apparatus is disclosed in Jpn. Pat. Appln. Laid-Open Publication No. 2005-227218, the entire content of which is incorporated herein by reference. With this configuration, a simple apparatus configuration can be obtained by reducing the laser transmission distance. Further, the energy level of the laser that can be transmitted is high, so that machining can be done with low irradiation density, thereby reducing machining time. Further, a positioning mechanism is simplified to achieve positioning at short times.

A laser oscillator used in such a laser peening apparatus is influenced in its performance by the temperature of environment in use. In general, the temperature range is specified in the laser oscillator, and when the temperature of use environment is too high or too low with respect to the specified temperature range, the performance deteriorates. Thus, generally, cooling water is used to cool the laser oscillator so as to prevent the laser oscillator from becoming a state of higher temperature due to heating of the oscillator itself. In general, a cooling water supplying apparatus is mounted on a power supply apparatus for the laser oscillator to cool the laser oscillator by supplying the cooling water.

However, in the case of the abovementioned apparatus, when the cooling water is supplied to the laser oscillator from the power supply apparatus on the operation floor, the temperature of the cooling water flowing in a supplying path is influenced by reactor water. It is possible to adjust the temperature of the cooling water with the influence due to the reactor water taken into consideration if the distance from the water surface to the laser oscillator is small. However, the temperature of the reactor water may change according to the depth and, therefore, the useful range of the above method is within about 5 m depth. The reactor pressure vessel has a height of 20 m or more, so 5 m is not sufficient.

BRIEF DESCRIPTION OF THE DRAWINGS

The features and advantages of the present invention will become apparent from the discussion hereinbelow of specific, illustrative embodiments thereof presented in conjunction with the accompanying drawings, wherein.

DETAILED DESCRIPTION

In view of the above-identified problem, an object of the present embodiments is to provide a laser irradiation apparatus in which a laser oscillator is disposed in water and capable of keeping the temperature of the laser oscillator at an adequate level regardless of the depth of water in which the laser oscillator is disposed.

According to an embodiment, a laser irradiation apparatus disposed in water and performing maintenance/repair using laser, said apparatus comprising: an environment isolation container which houses a laser oscillator and is disposed in water; a laser irradiation head which collects laser light and irradiates a part to be machined with the laser light; a light guide section which transmits the laser light from the laser oscillator to the laser irradiation head; a power supply apparatus which supplies the laser oscillator with power; a cooling water supplying apparatus which supplies the laser oscillator with cooling water through a cooling water supplying path; and a temperature sensor which measures the temperature inside the environment isolation container, wherein at least one of temperature and flow rate of the cooling water to be supplied from the cooling water supplying apparatus is controlled based on the measurement result obtained from the temperature sensor.

According to another embodiment, a laser machining method in which a laser irradiation apparatus provided with a laser oscillator housed in an environment isolation container and a laser irradiation head which collects laser light emitted from the laser oscillator and irradiates a part to be machined with the laser light is disposed in water, and which performs machining using the laser for an object to be machined; comprising: measuring the temperature inside the environment isolation container with use of a temperature sensor and controlling at least one of the temperature and flow rate of cooling water to be supplied to the laser oscillator based on the measurement result of the temperature sensor.

Now, preferred embodiments of the laser irradiation apparatus will be described by referring to the accompanying drawings. Throughout the drawings, same or similar sections are denoted by the same reference symbols and will not be described repeatedly.

First Embodiment

Figure 1:
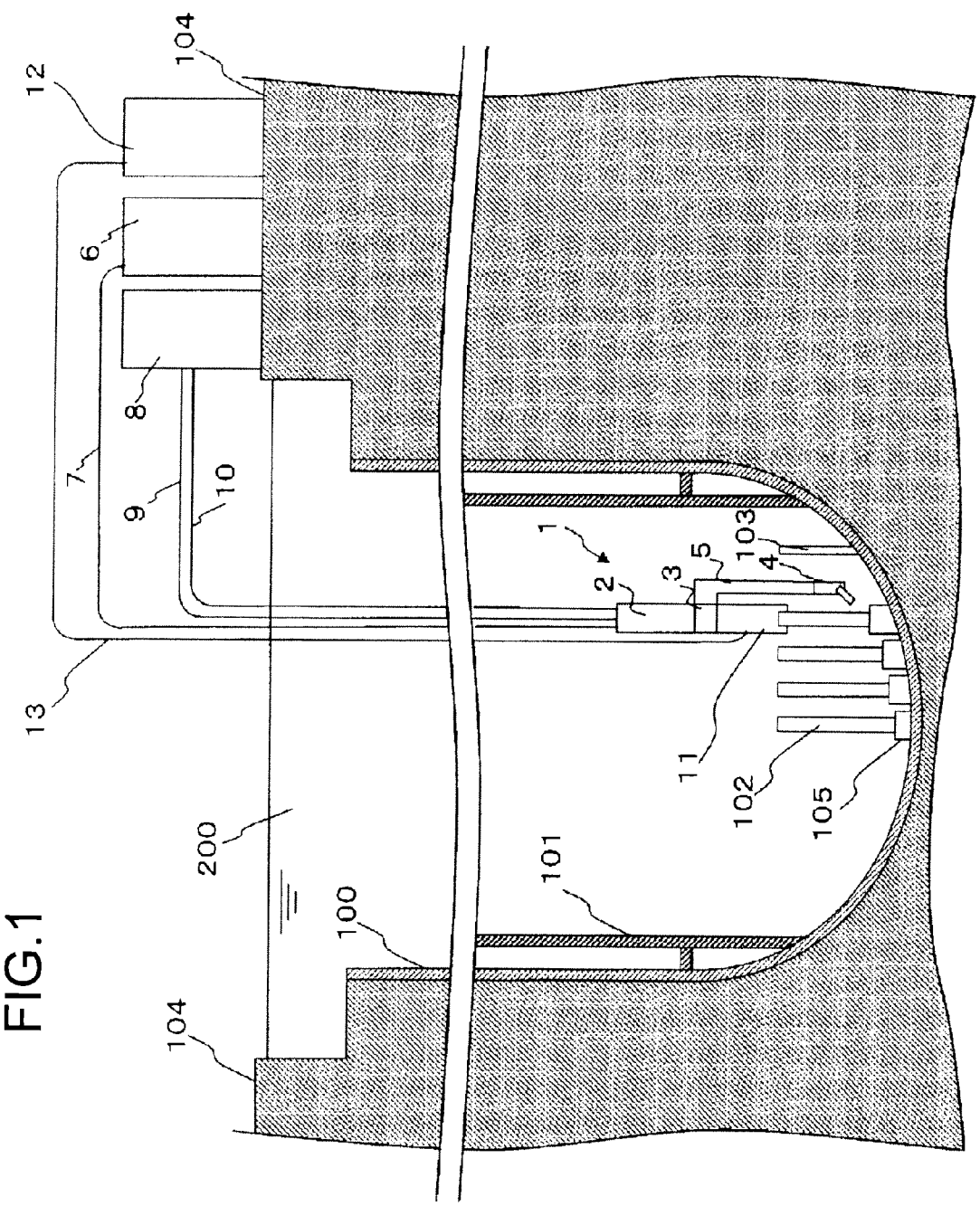
FIG. 1 is a vertical cross-sectional view schematically illustrating a state where a laser irradiation apparatus according to a first embodiment is installed in a reactor pressure vessel.

A first embodiment will be described with reference to the accompanying drawings. FIG. 1 is a vertical cross-sectional view schematically illustrating a state where a laser irradiation apparatus 1 according to the present embodiment is applied to a reactor pressure vessel 100 filled with reactor water 200. In FIG. 1, the middle part of the reactor pressure vessel 100 is omitted and only the lower and upper end portions thereof are illustrated. Further, in-reactor structures at the bottom part of the reactor pressure vessel 100 are illustrated in a partly omitted manner.

At the bottom part of the reactor pressure vessel 100, CRD (Control Rod Drive) housings 102 and ICMs (In-core Monitors) 103 are provided inside a shroud 101. Although a large number of the CRD housings 102 and a large number of the ICMs 103 are provided, only some of them are illustrated in FIG. 1. A laser irradiation apparatus 1 and a remote driver 11 for the laser irradiation apparatus 1 are provided on one of the CRD housings 102. The remote driver 11 is a driver that rotates the laser irradiation apparatus around the CRD housings 102 as rotating axis or vertically moves the laser irradiation apparatus 1. The remote driver 11 is connected to a remote driver control panel 12 installed on an operation floor 104 via a remote driver cable 13.

The laser irradiation apparatus 1 includes an environment isolation container 2 having a laser oscillator, a mirror box 3, a laser irradiation head 4 having a collecting lens for collecting laser light, and an L-shaped light guide section 5. The mirror box 3 is connected to the lower part of the environment isolation container 2. A laser irradiation head 4 has a collecting lens for collecting laser light. The L-shaped light guide section 5 transmits the laser light from the mirror box 3 to the laser irradiation head 4.

The laser oscillator provided in the environment isolation container 2 is connected to a power supply apparatus 6 on the operation floor 104 via a laser oscillator cable 7. The laser oscillator cable 7 is a composite electrical cable including wires for supplying power to the laser oscillator and wires for transmitting signals of measuring instruments provided in the laser irradiation apparatus 1.

A cooling water supplying hose 9 is a supplying path of cooling water for the laser oscillator, and cooling water is supplied from a cooling water supplying apparatus 8 installed on the operation floor 104 to the laser oscillator through the cooling water supplying hose 9. The cooling water supplied to the laser oscillator through the cooling water supplying hose 9 is then returned through a cooling water returning hose 10 to the cooling water supplying apparatus 8.

FIG. 1 shows the case that the laser irradiation apparatus 1 is applied to laser peening to the CRD housings 102; however, by changing its installation position or by operating the remote driver 11, it is possible to be applied to the laser peening also to the shroud 101, the ICMs 103, stub tubes 105 penetrating the bottom part of the reactor pressure vessel 100, and the like.

Figure 2:
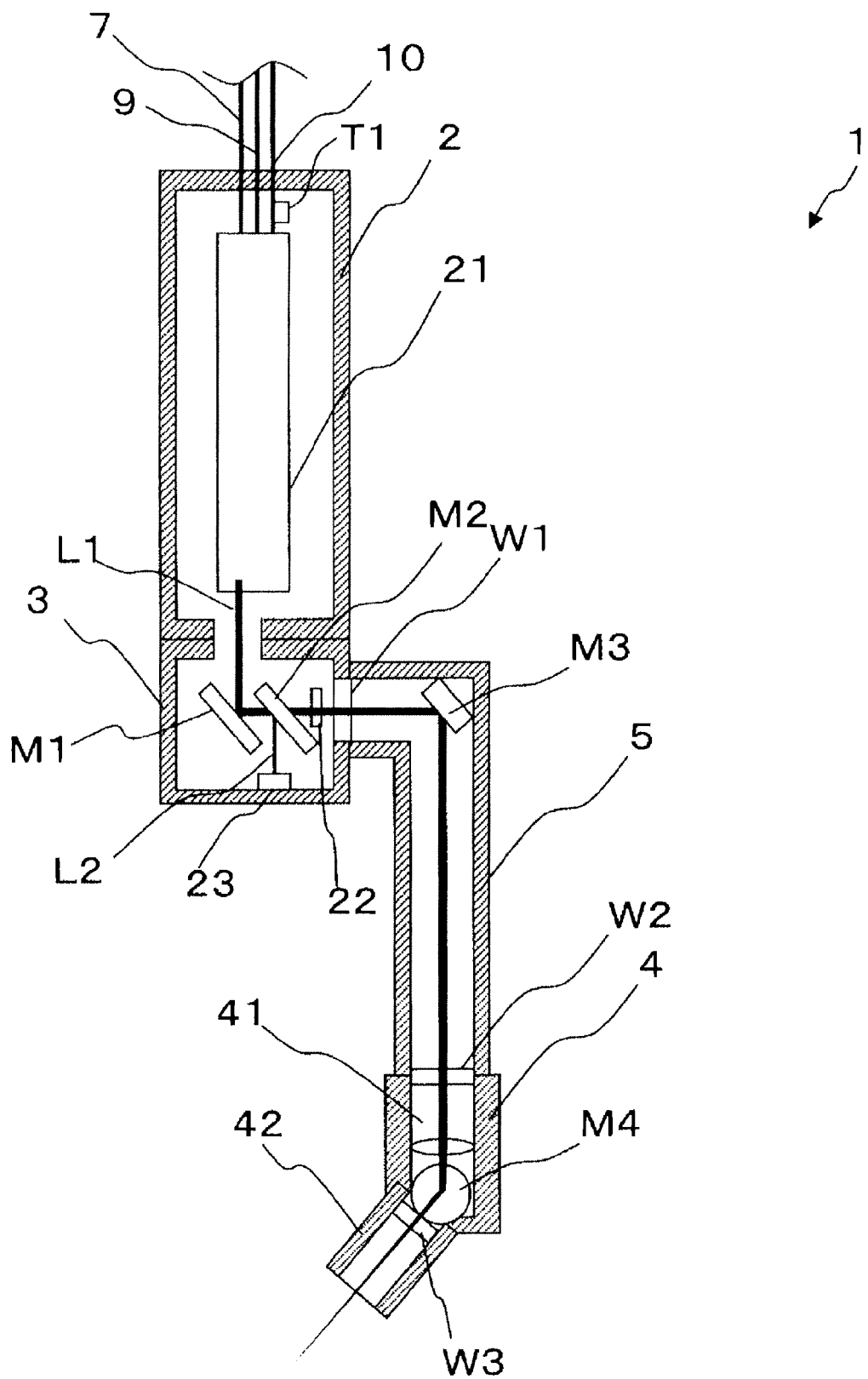
FIG. 2 is a vertical cross-sectional view schematically illustrating the laser irradiation apparatus according to the first embodiment.

A configuration of the laser irradiation apparatus 1 will be described in detail using FIG. 2. FIG. 2 is a vertical cross-sectional view schematically illustrating the laser irradiation apparatus 1. A laser oscillator 21 is disposed inside the environment isolation container 2. The laser oscillator cable 7, the cooling water supplying hose 9, and the cooling water returning hose 10 are connected to the laser oscillator 21. A temperature sensor T1 is attached to the cooling water returning hose 10. The temperature sensor T1 measures the temperature of cooling water flowing in the cooling water returning hose 10. A black coating for effectively absorbing radiation heat generated in the laser oscillator 21 is formed on the surfaces of the environment isolation container 2 opposite to the laser oscillator 21. The radiation heat absorbed by the environment isolation container 2 is discharged to the reactor water 200.

The lower part of the environment isolation container 2 is connected to the mirror box 3. The mirror box 3 has inside thereof an optical axis adjustment mirror M1, a sampling mirror M2, a shutter 22, and a photodetector 23.

One side surface of the mirror box 3 is connected to the light guide section 5, and a window W1 is formed at the connection part. The light guide section 5 has a hollow structure and has a mirror M3 at its L-shaped refracting portion (hereinafter, referred to as an elbow part). The lower end of the light guide section 5 is connected to the laser irradiation head 4, and a window W2 is formed at the connection part.

The laser irradiation head 4 has a collecting lens 41 below the window W2 and has a mirror M4 below the collecting lens 41. A nozzle 42 through which laser light reflected at the mirror M4 is emitted from the inside of the laser irradiation head 4 is provided at the lower end of the laser irradiation head 4. The nozzle 12 has a window W3 inside thereof.

The path of the laser light inside the laser irradiation apparatus 1 will be described in detail. The laser light emitted from the laser oscillator 21 is, as indicated by L1, reflected at the optical axis adjustment mirror M1 in the mirror box 3. The laser light reflected at the optical axis adjustment mirror M1 collides with the sampling mirror M2. The sampling mirror M2 has a reflectance of less than 1% and thus transmits most of the laser light and reflects a small percentage of the laser light as indicated by L2.

The reflected laser light is irradiated onto the photodetector 23 through the path indicated by L2. The photodetector 23 converts the intensity of the laser light irradiated thereonto into an electrical signal and transmits the electrical signal to a not-illustrated light intensity measurement apparatus through the laser oscillator cable 7. The light intensity measurement apparatus allows the laser light output to be monitored. As the photodetector 23, a photodiode, a Peltier device, a solar battery, or the like may be used.

The shutter 22 switches between closing and opening of the laser light path according to a demand of driving which is transmitted, in the form of an electrical signal, from a not-illustrated shutter drive apparatus through the laser oscillator cable 7. In the case where the shutter 22 is in an open state, the laser light passing through the sampling mirror M2 passes through the window W1 and enters the light guide section 5.

The laser light that has entered the light guide section 5 is reflected at the mirror M3, passes through the window W2, and enters the laser irradiation head 4. The laser light that has entered the laser irradiation head 4 is focused by the collecting lens 41, reflected at the mirror M4, passes through the window W3 of the nozzle 42, and is irradiated onto a target of the laser peening.

The laser light emitted from the laser oscillator 21 is irradiated onto the target of the laser peening through the abovementioned path.

Figure 3:
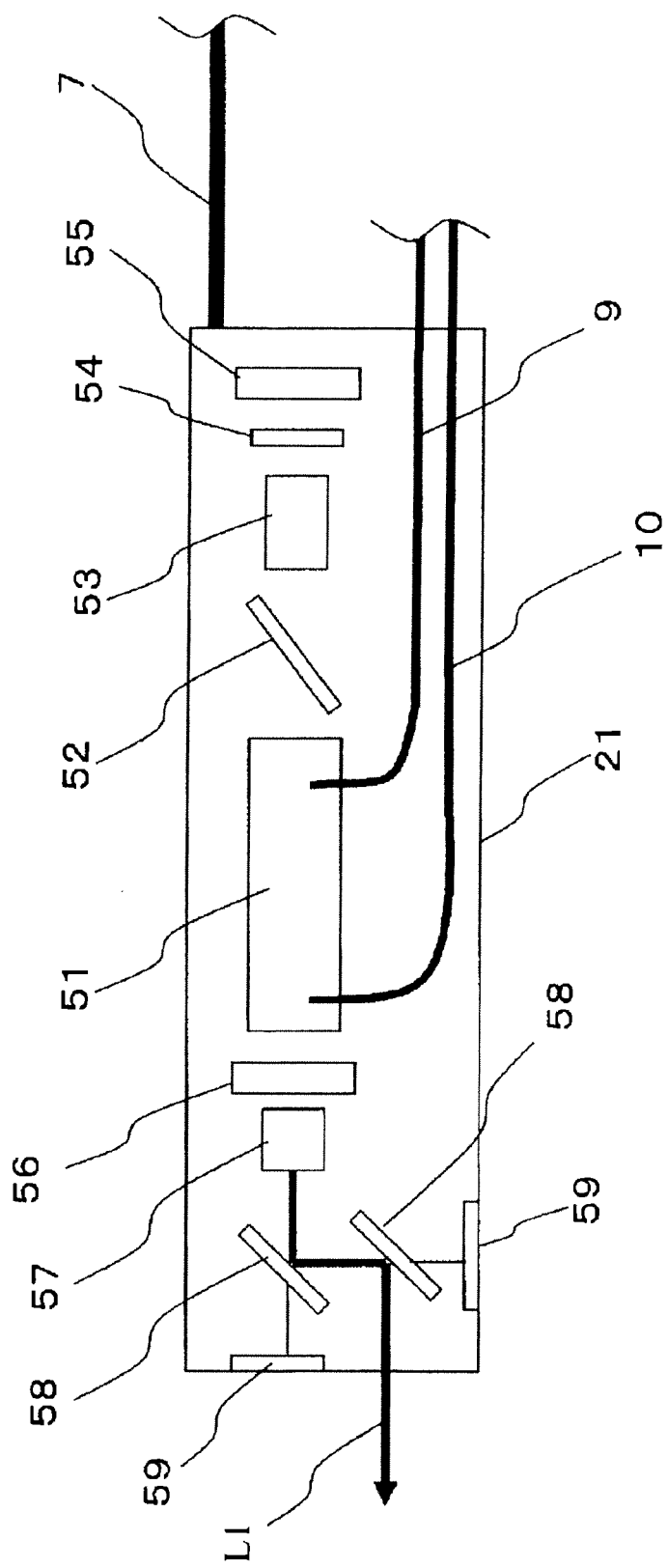
FIG. 3 is a vertical cross-sectional view schematically illustrating a structure of the laser oscillator.

Next, a structure of the laser oscillator 21 will be described in detail using FIG. 3. FIG. 3 is a vertical cross-sectional view schematically illustrating the laser oscillator 21. The laser oscillator 21 used in the present embodiment is a Flashlamp-Pumped Q-Switched Nd:YAG Laser and has a flash lamp and a YAG rod (which are not illustrated) in a pumping chamber 51. Together with the pumping chamber 51, a resonator is formed in a polarization plate 52, a Q switch 53, a λ/4 plate 54, a rear mirror 55, and an output coupler 56. Laser light of a wavelength of 1064 nm emitted from the resonator is converted into a second harmonic (wavelength: 532 nm) by a second harmonic generator (SHG) 57. Dichroic mirrors 58 select and extract only the second harmonic from the laser light having different wavelengths of 1064 nm and 532 nm as laser light L1. The fundamental wave separated at this time is absorbed by dumpers 59 and converted into heat.

A not-illustrated cooling pipe is provided inside the pumping chamber 51. The cooling pipe is connected to the cooling water supplying hose 9 introduced from the laser oscillator 21 and the cooling water returning hose 10 so as to allow the cooling water to flow in the cooling pipe. The flow of the cooling water in the cooling pipe cools the flash lamp or YAG rod in the pumping chamber 51.

In order to effectively oscillate the laser oscillator 21, it is necessary to maintain the temperature of the pumping chamber 51 within an appropriate range. However, the height of the reactor pressure vessel 100 is about 20 m or more, and the length of the cooling water supplying hose 9 extending from the operation floor 104 to the reactor bottom part of the reactor pressure vessel 100 as illustrated reaches about 20 m or more. Thus, the cooling water exchanges heat with the reactor water 200 until it reaches the laser oscillator 21 from the cooling water supplying apparatus 8. Therefore, there exists a temperature difference between the cooling water at the time point when it exists inside the cooling water supplying apparatus 8 and the cooling water at the time point when it exists near the laser oscillator 21.

Further, the temperature of the reactor water 200 is not uniform from the water surface to the bottom part of the reactor pressure vessel 100. Thus, it is difficult to set the temperature level of the cooling water to be supplied from the cooling water supplying apparatus 8 considering the influence due to the reactor water 200 previously.

In order to cope with this, the temperature sensor T1 is provided to the cooling water returning hose 10 in the laser oscillator 21 so as to measure the temperature of the cooling water near the laser oscillator 21 and, based on the measurement result, one or both of the temperature and flow rate of the cooling water supplied from the cooling water supplying apparatus 8 to the pumping chamber 51 is controlled.

Specifically, when it is determined from the measurement result of the temperature of the cooling water at the laser oscillator 21 that the cooling of the laser oscillator 21 is insufficient, the temperature of the cooling water to be supplied from the cooling water supplying apparatus 8 is lowered, or flow rate thereof is increased, or flow rate thereof is increased while lowering the cooling water temperature. By adjusting the temperature or flow rate of the cooling water to be supplied from the cooling water supplying apparatus 8, it is possible to maintain the temperature of the laser oscillator 21 at an adequate level.

According to the laser irradiation apparatus of the present embodiment, the temperature of the laser oscillator can be maintained at an adequate level to thereby obtain a stable laser output even in an underwater environment where a supplying path of the cooling water is long and environmental temperature of the supplying path is not maintained constant.

Although the temperature sensor T1 is provided to the cooling water returning hose 10 in the present embodiment, it may be alternatively provided to the cooling water supplying hose 9. The amount of heat generation of the laser oscillator 21 can be identified from the output of the laser oscillator 21 or specification of the power supply apparatus 6. Therefore, when the temperature and flow rate of the cooling water to be supplied to the laser oscillator 21 are known, the temperature of the laser oscillator 21 can be calculated, which enables the cooling water supplying apparatus 8 to be controlled based on the calculated temperature of the laser oscillator 21. Naturally, the temperature sensor may be provided to both the cooling water supplying hose 9 and the cooling water returning hose 10.

Second Embodiment

A laser irradiation apparatus according to a second embodiment will be described below using the drawing. The same reference numerals are given to the same elements as those of the first embodiment, and the explanation is not repeated.

Figure 4:
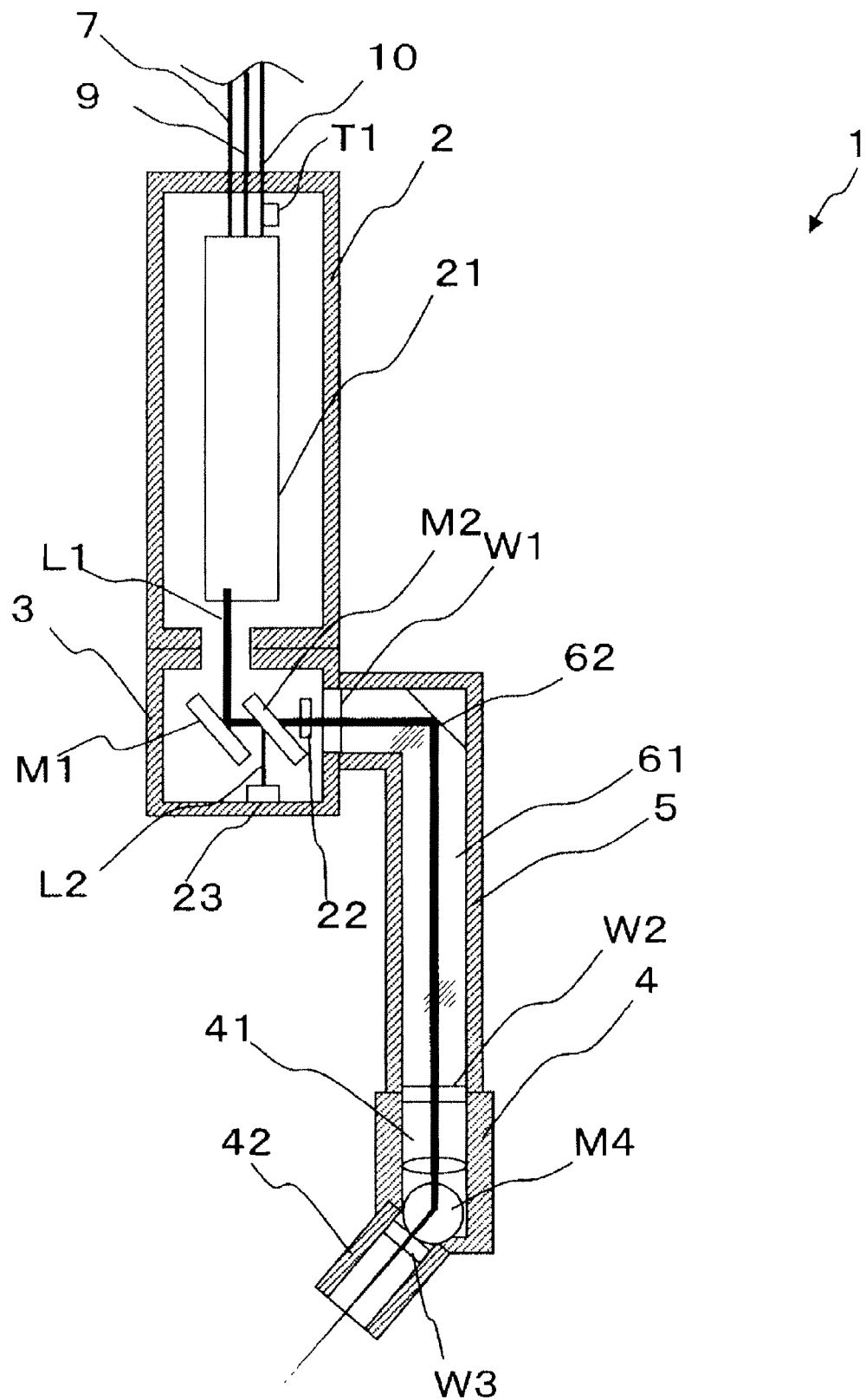
FIG. 4 is a vertical cross-sectional view schematically illustrating a laser irradiation apparatus according to a second embodiment.

FIG. 4 is a vertical cross-sectional view schematically illustrating the laser irradiation apparatus 1 according to the present embodiment. The inside of the light guide section 5, which is hollow in the first embodiment, is filled with a transparent medium 61 such as glass or crystalline quartz in this embodiment. A slope 62 that makes total reflection of the laser light is formed in the elbow part. As a result, the inside of the light guide section 5 is formed as a prism, and the laser light is discharged from the laser irradiation head 4 through the same path as that of the first embodiment.

The present embodiment provides the same effects as those of the first embodiment. Further, the laser path inside the light guide section 5 is constructed of the transparent medium 61, which eliminates a risk of intrusion of water into the light guide section 5 and eliminates refraction and scattering of the laser light due to convection or change in density of a gas inside the light guide section 5.

Third Embodiment

A third embodiment will be described below using the drawing. The same reference numerals are given to the same elements as those of the first embodiment, and the explanation is not repeated.

Figure 5:
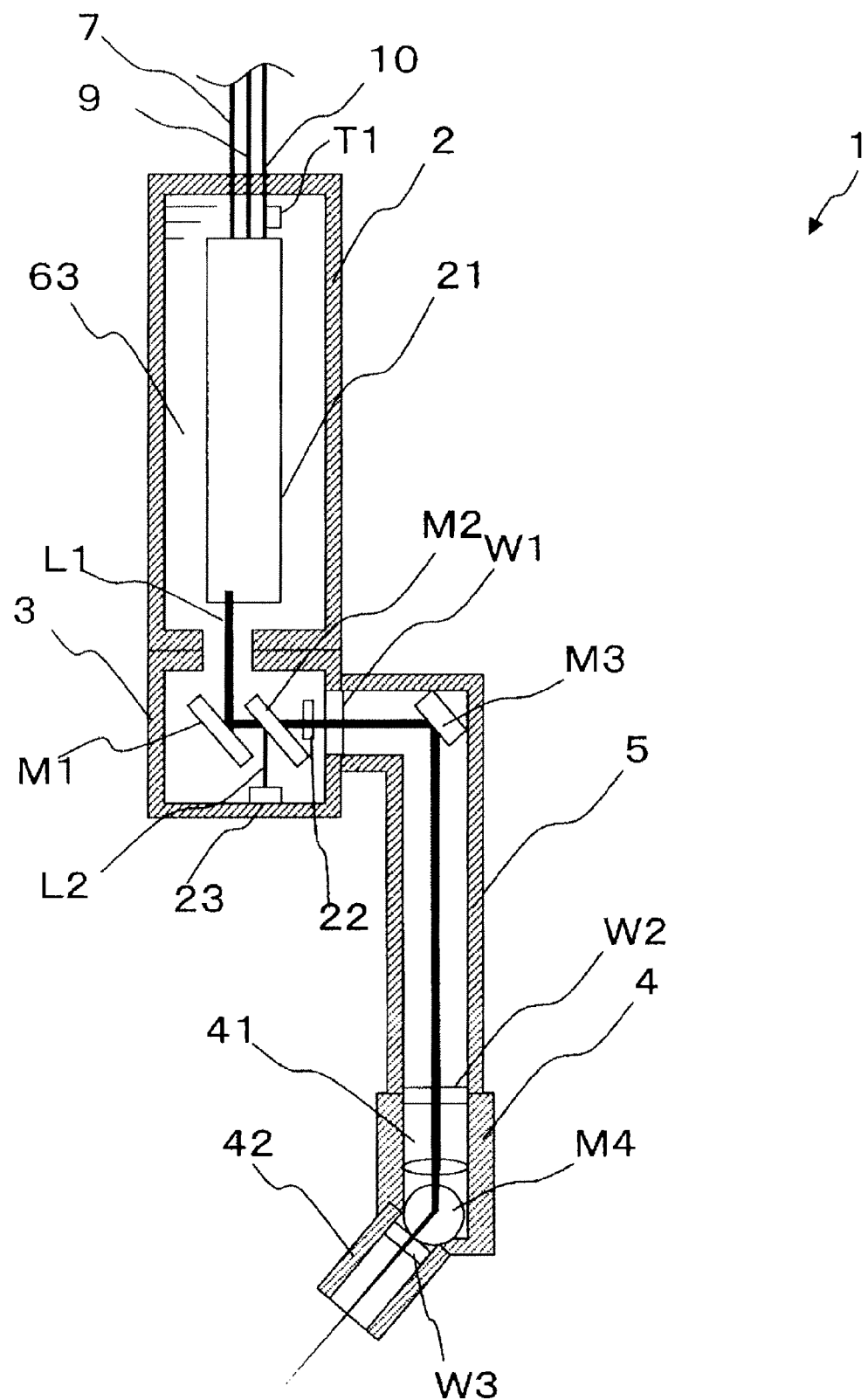
FIG. 5 is a vertical cross-sectional view schematically illustrating a laser irradiation apparatus according to a third embodiment.

FIG. 5 is a vertical cross-sectional view schematically illustrating the laser irradiation apparatus 1 according to the present embodiment. In the present embodiment, noncompressible environmental protection liquid 63 having high electrical isolation performance is injected into the environment isolation container 2. As the environmental protection liquid 63, liquid having high electrical isolation performance, such as pure water, silicon oil, refractive index-matching liquid, or the like is used. Since optical components constituting the laser oscillator 21 directly contact the environmental protection liquid 63, a design considering a difference in the refractive index has been made.

Thus, the configuration in which the environment isolation container 2 is filled with the environmental protection liquid 63 prevents pressure difference between outer side and inner side of the boundary portion of environment isolation container 2 from occurring due to water depth, thereby enhancing resistance against intrusion of water. Further, the entire laser oscillator 21 including the pumping chamber 51 contacts the liquid, effectively transmitting heat to the outside, which enhances heat radiation performance.

The present embodiment provides the same effects as those of the first embodiment. Further, there can be provided an environmentally-resistant laser irradiation apparatus achieving a stable output even in a deep underwater environment where environmental temperature is not maintained constant.

Fourth Embodiment

A fourth embodiment invention will be described below using the drawing. The same reference numerals are given to the same elements as those of the first embodiment, and the explanation is not repeated.

Figure 6:
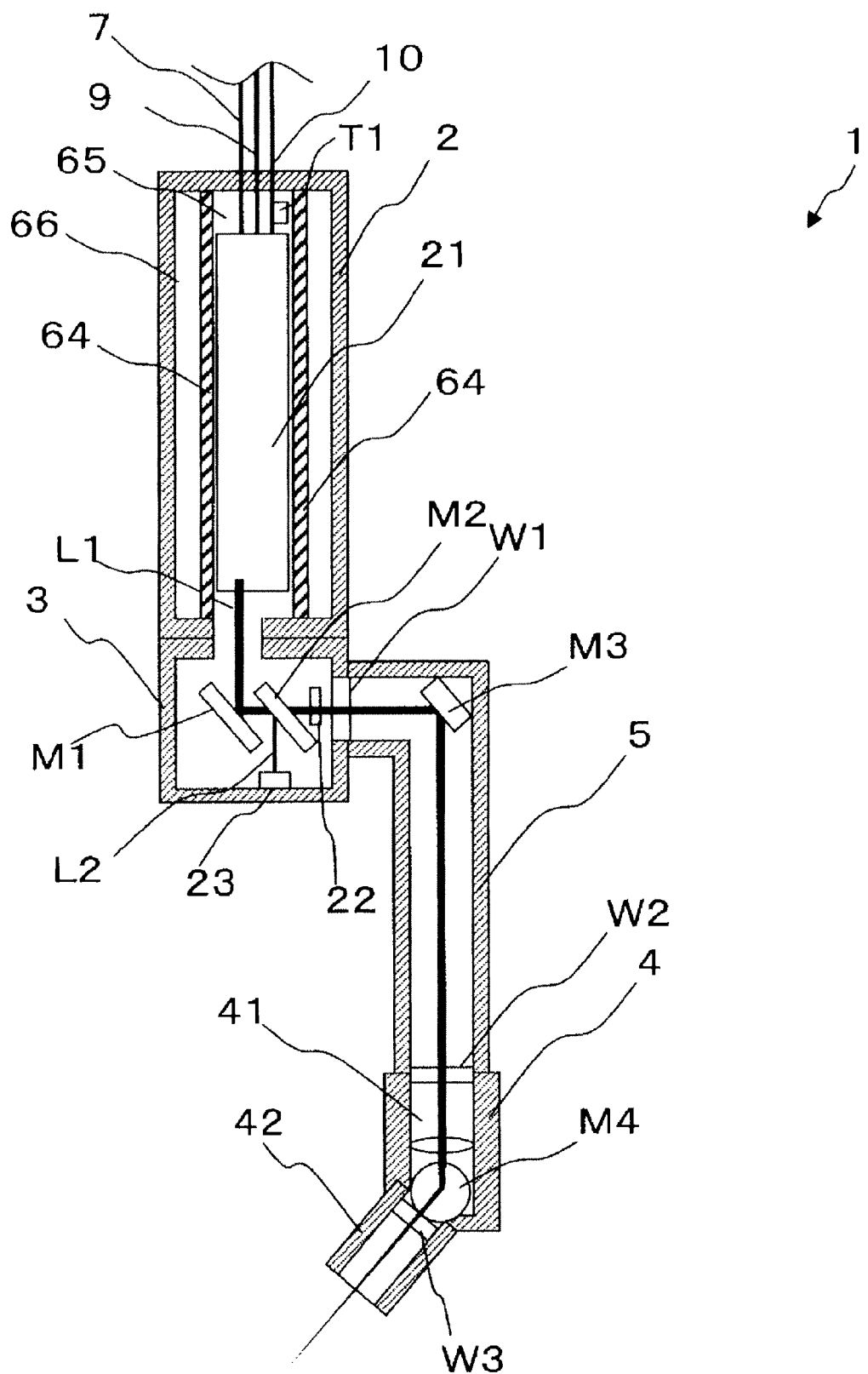
FIG. 6 is a vertical cross-sectional view schematically illustrating a laser irradiation apparatus according to a fourth embodiment.

FIG. 6 is a vertical cross-sectional view schematically illustrating the laser irradiation apparatus 1 according to the present embodiment. In the present embodiment, an air-chamber partition 64 is provided inside the environment isolation container 2 so as to divide the inner space of the environment isolation container 2 into a laser oscillator installation space 65 and an isolation space 66. The inside of the isolation space 66 is filled with gas such as air or helium.

With the above configuration, it is possible to enhance heat insulating property between the laser oscillator 21 and outside of the environment isolation container 2, thereby suppressing influence that outside environment gives to the laser oscillator 21. In order to enhance the heat insulating property, it is possible to lower the atmospheric pressure of gas filled in the isolation space 66 or to install a heat insulating material in the isolation space 66 in place of the gas. Further, although the air-chamber partition 64 has a co-axial cylindrical shape with the cylindrical portion of the environment isolation container 2 and thus the isolation space 66 is one continuous space, partitions may be added in the radial direction of the environment isolation container 2 so as to divide the isolation space 66.

The present embodiment provides the same effects as those of the first embodiment. Further, it is possible to enhance heat insulating property between the laser oscillator 21 and outside environment of the environment isolation container 2, thereby suppressing influence that outside environment gives to the laser oscillator 21.

Fifth Embodiment

A laser irradiation apparatus according to a fifth embodiment will be described using the drawing. The same reference numerals are given to the same elements as those of the first and fourth embodiments, and the explanation is not repeated.

Figure 7:
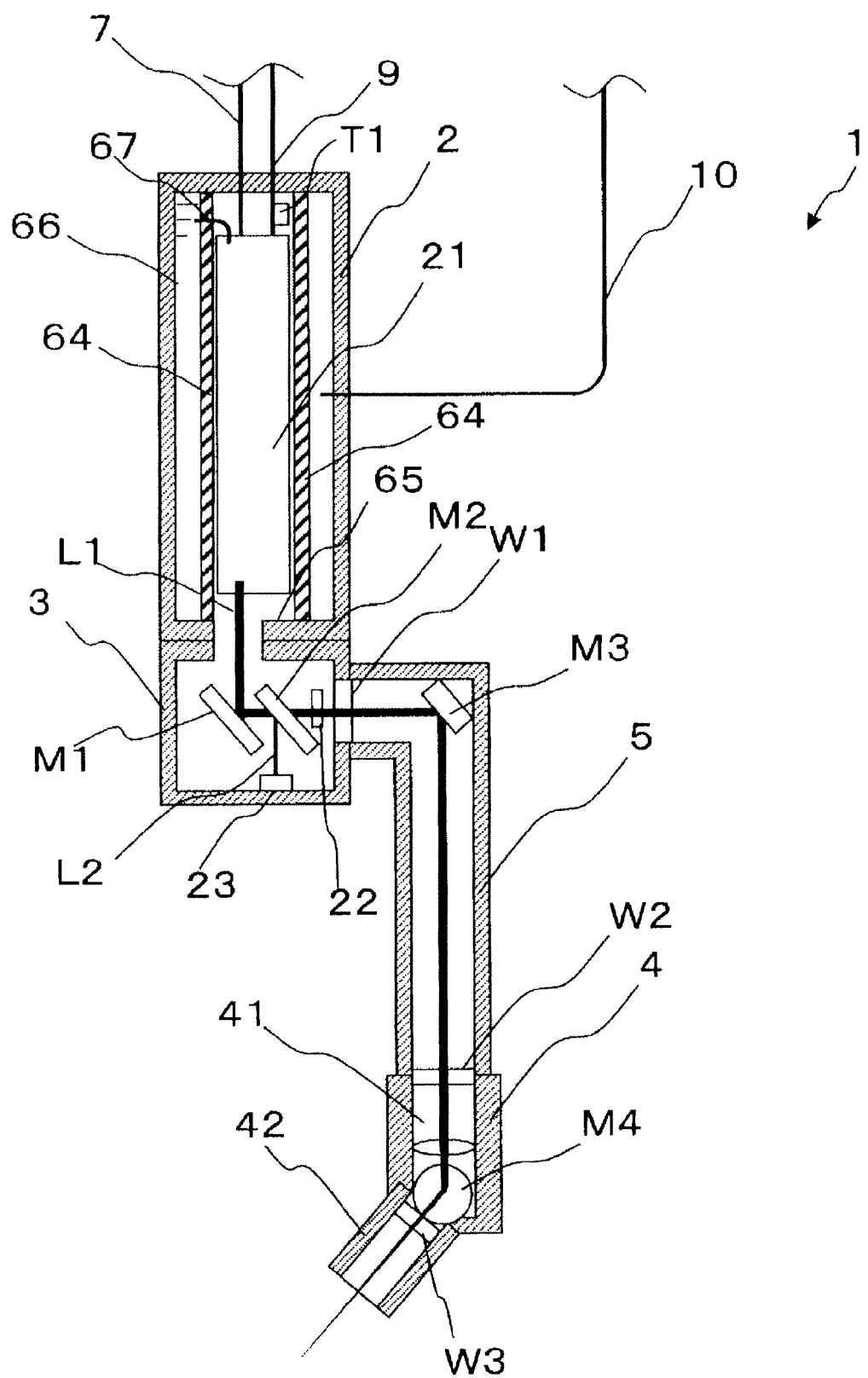
FIG. 7 is a vertical cross-sectional view schematically illustrating a laser irradiation apparatus according to a fifth embodiment.

FIG. 7 is a vertical cross-sectional view schematically illustrating the laser irradiation apparatus 1 according to the present embodiment. In the present embodiment, a connecting pipe 67 connecting the laser oscillator 21 to the isolation space 66 is arranged. The cooling water returning hose 10 is connected not to the laser oscillator 21 but to the isolation space 66. The connecting pipe 67 is connected to a not-illustrated pipe in the pumping chamber 51 inside the laser oscillator 21 so that the cooling water to be supplied from the cooling water supplying hose 9 to the pumping chamber 51 cools the pumping chamber 51 and is then fed to the isolation space 66 through the connecting pipe 67. Thus, the isolation space 66 is filled with cooling water, and the cooling water is returned from the cooling water returning hose 10 to the cooling water supplying apparatus 8.

The temperature of the cooling water to be fed to the isolation space 66 is constant when the laser oscillator 21 is operated at a constant output. Therefore, the temperature inside the isolation space 66 is maintained constant. This allows the heat inside of the isolation space 66 to be removed by the cooling water even if the isolation space 6 is heated by the outer environment of the environment isolation container 2, thereby preventing temperature rise of the isolation space 66.

The present embodiment provides the same effects as those of the first embodiment. Further, by maintaining the temperature inside the isolation space 66 nearly constant, the temperature inside the laser oscillator installation space 65 can be kept more stable.

Sixth Embodiment

A laser irradiation apparatus according to a sixth embodiment will be described using the drawing. The same reference numerals are given to the same elements as those of the first and fourth embodiments, and the explanation is not repeated.

Figure 8:
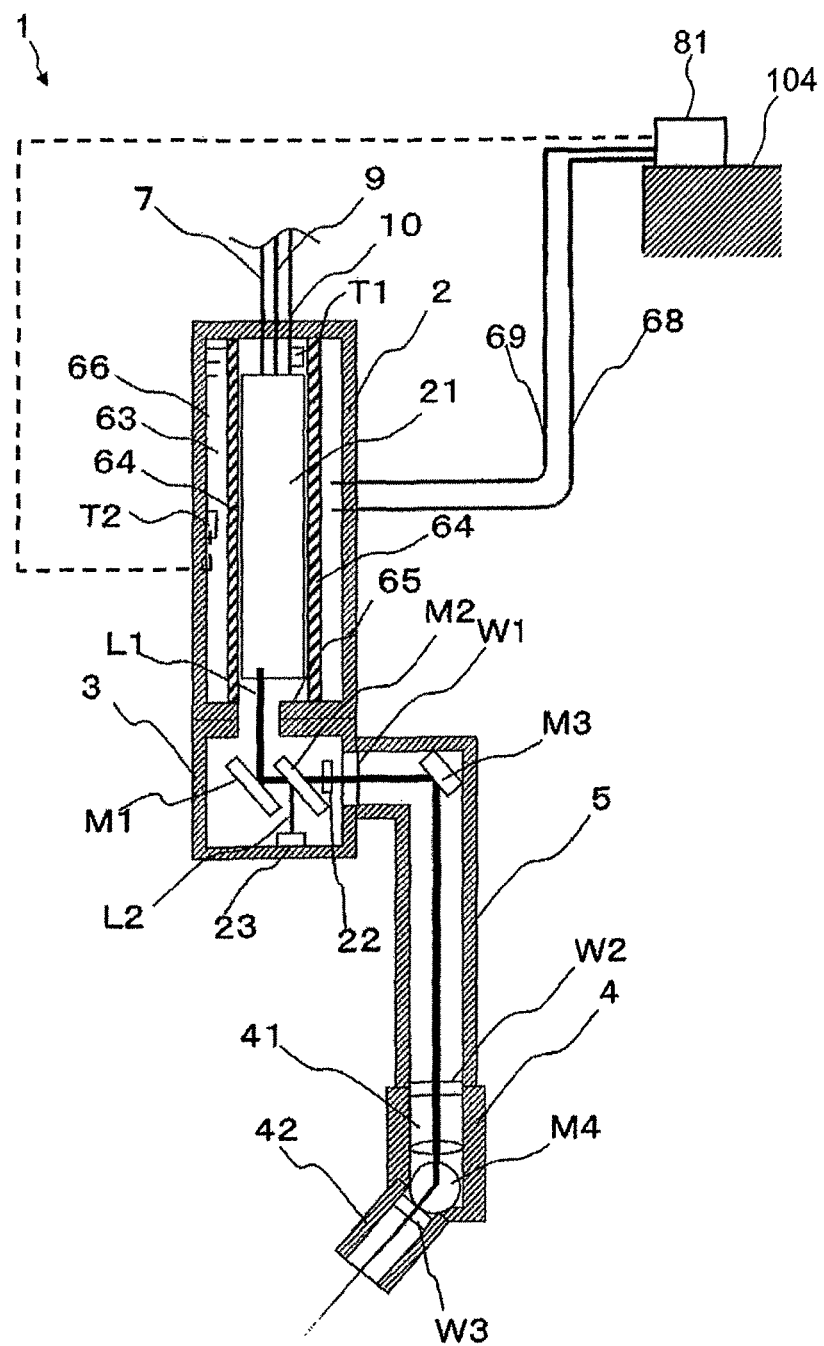
FIG. 8 is a vertical cross-sectional view schematically illustrating a laser irradiation apparatus according to a sixth embodiment.

FIG. 8 is a vertical cross-sectional view schematically illustrating the laser irradiation apparatus 1 according to the present embodiment. In the present embodiment, the environmental protection liquid 63 is injected in the isolated space 66, and a temperature sensor T2 is provided inside of the isolated space 66. Further, a temperature adjuster 81 is installed on the operation floor 104, and connected to the isolated space 66 through an environmental protection liquid supplying hose 68 and an environmental protection liquid returning hose 69. In the present embodiment, liquid such as water, silicon oil, or water solution having a freezing point lower than water is used as the environmental protection liquid 63.

The temperature adjuster 81 recovers the environmental protection liquid 63 through the environmental protection liquid returning hose 69, adjusts the temperature of the environmental protection liquid 63 based on the measurement result of the temperature sensor T2, to which the temperature adjuster 81 is connected as shown by dashed line in FIG. 8, and supplies the environmental protection liquid 63 to the isolated space 66 through the environmental protection liquid supplying hose 68. In this manner, the temperature adjuster 81 adjusts the temperature of the environmental protection liquid 63 while circulating it to thereby maintain the temperature inside the isolated space 66 constant.

The present embodiment provides the same effects as those of the first embodiment. Further, by maintaining the temperature inside the isolated space 66 constant, the temperature inside the laser oscillator installation space 65 can be made more stable.

Seventh Embodiment

A laser irradiation apparatus according to a seventh embodiment will be described using the drawing. The same reference numerals are given to the same elements as those of the first embodiment, and the explanation is not repeated.

Figure 9:
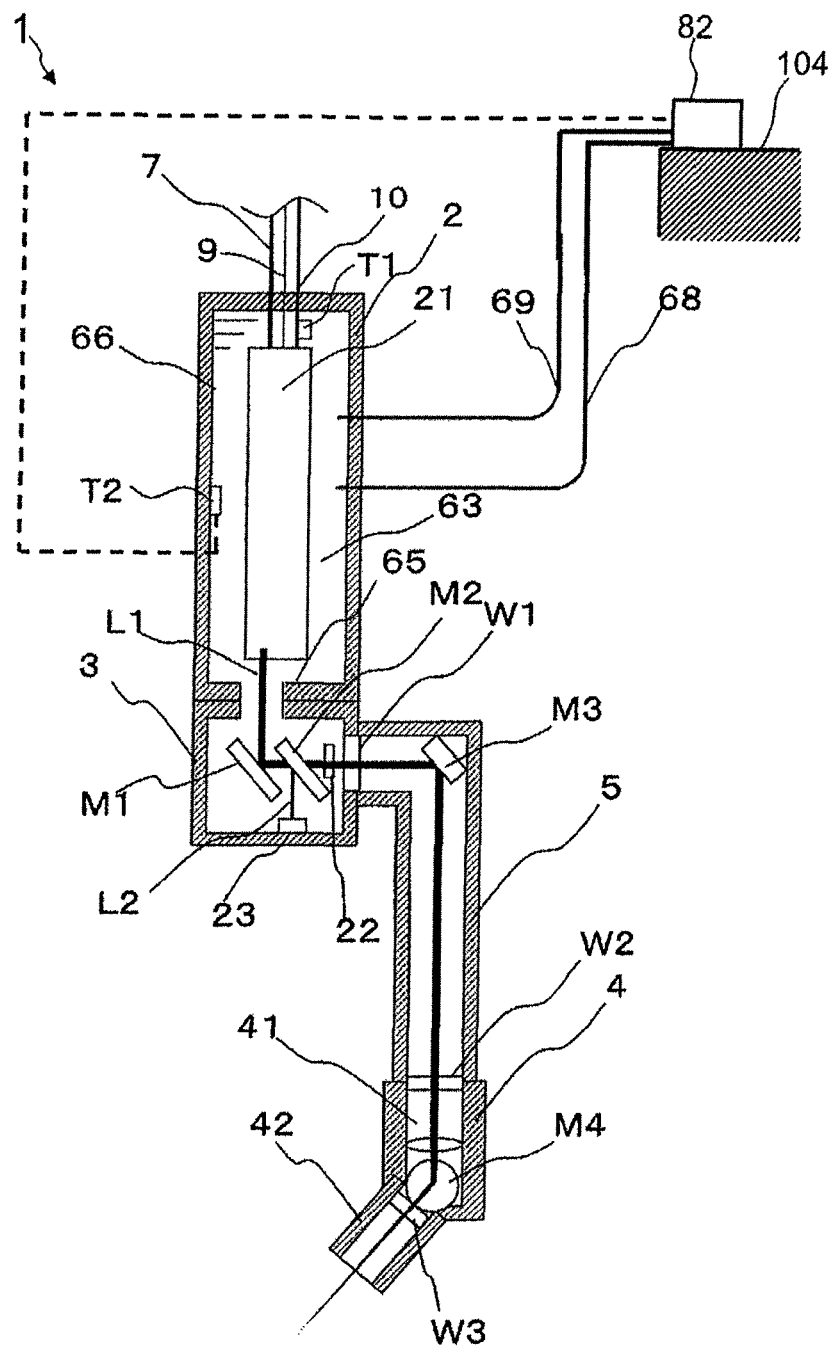
FIG. 9 is a vertical cross-sectional view schematically illustrating a laser irradiation apparatus according to a seventh embodiment.

FIG. 9 is a vertical cross-sectional view schematically illustrating the laser irradiation apparatus 1 according to the present embodiment. The insides of the environment isolation container 2 and the mirror box 3 are filled with the environmental protection liquid 63. Further, a temperature adjuster 82 is installed on the operation floor 104. The temperature adjuster 82 is connected to the isolation space 66 through the environmental protection liquid supplying hose 68 and the environmental protection liquid returning hose 69. Further, the temperature sensor T2 for measuring the temperature of the environmental protection liquid 63 inside the environment isolation container 2 and mirror box 3 is provided. In the present embodiment, noncompressible fluid having high electrical isolation performance, such as pure water, silicon oil, refractive index-matching liquid, or the like is preferably used as the environmental protection liquid 63.

The temperature adjuster 82 recovers the environmental protection liquid 63 through the environmental protection liquid returning hose 69, adjusts the temperature of the environmental protection liquid 63 based on the measurement result of the temperature sensor T2, to which the temperature adjuster 82 is connected as shown by dashed line in FIG. 9, and supplies the environmental protection liquid 63 to the environment isolation container 2 through the environmental protection liquid supplying hose 68. In this manner, the temperature adjuster 82 adjusts the temperature of the environmental protection liquid 63 with circulating it to thereby maintain the temperature inside the environment isolation container 2 nearly constant. Further, the configuration in which the environment isolation container 2 and the mirror box 3 are filled with the noncompressible fluid enhances resistance against intrusion of water.

The present embodiment provides the same effects as those of the first embodiment. Further, by maintaining the temperature inside the environment isolation container 2 or the mirror box 3 constant, the temperature inside the laser oscillator installation space 65 can be kept more stable. Further, resistance of the environment isolation container 2 or the mirror box 3 against intrusion of water can be enhanced.

Eighth Embodiment

A laser irradiation apparatus according to an eighth embodiment will be described using the drawing. The same reference numerals are given to the same elements as those of the first embodiment, and the explanation is not repeated.

Figure 10:
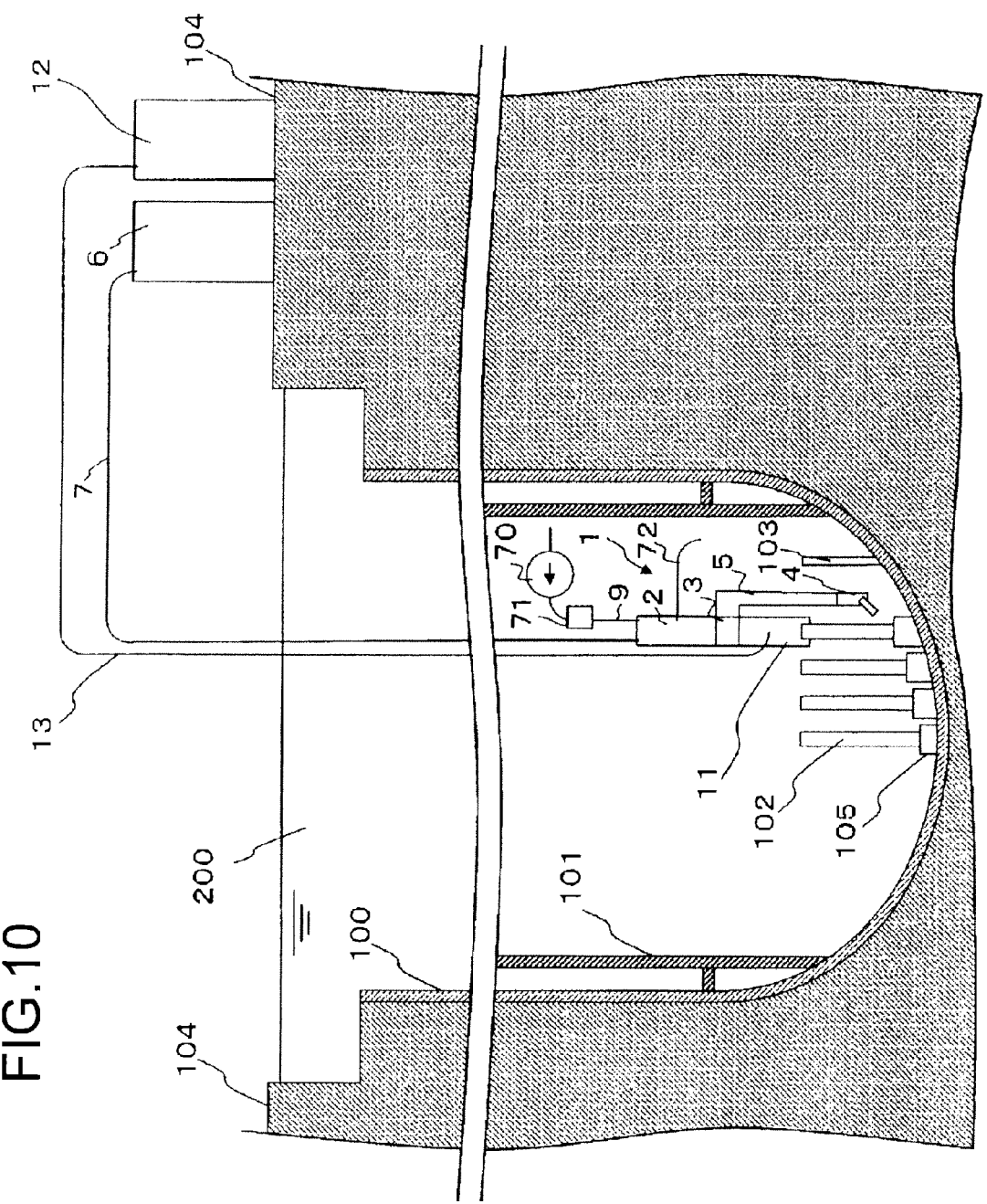
FIG. 10 is a vertical cross-sectional view schematically illustrating a state where a laser irradiation apparatus according to an eighth embodiment is installed in a reactor pressure vessel.

FIG. 10 is a vertical cross-sectional view schematically illustrating a state where the laser irradiation apparatus 1 according to the present embodiment is installed in the reactor pressure vessel 100.

In the present embodiment, in place of the cooling water supplying apparatus 8, a pump 70 disposed in the reactor water 200 is connected to the environment isolation container 2 through the cooling water supplying hose 9. Further, an impurity remover 71 is provided at interposition of the cooling water supplying hose 9. The impurity remover 71 is a device for removing impurities from water passing through the cooling water supplying hose 9 and comprises a filter and an ion-exchange resin. Further, in place of the cooling water returning hose 10, a cooling water discharging hose 72 connected to the laser oscillator 21 and having one end opened in the reactor water 200 is provided.

In the present embodiment, the pump 70 functions as the cooling water supplying apparatus 8. The pump 70 sends the reactor water to the environment isolation container 2 through the cooling water supplying hose 9. The output of the pump 70 is controlled based on the measurement result of the temperature sensor T1 to control the flow rate of the cooling water. The reactor water is filtered by the impurity remover 71, so that radioactive materials are not introduced into the environment isolation container 2. The cooling water that has cooled the laser oscillator 21 is discharged into the reactor pressure vessel 100 through the cooling water discharging hose 72.

The present embodiment provides the same effects as those of the first embodiment. Further, the structure of the cooling system of the laser irradiation apparatus 1 is simplified to eliminate need to extend the hoses from the operation floor 104 to the bottom part of the reactor pressure vessel 100 for supplying and recovering the cooling water.

It should be noted that although some embodiments of the present invention have been described above with reference to the drawings, these embodiments are presented as examples, and are not intended to limit the scope of the invention. These novel embodiments can be implemented in other various forms. And various abbreviations, exchanges, and changes can be made within a scope not deviating from the essence of the invention. These embodiments and their modifications are included in the scope and essence of the invention, and are included in the invention described in the claims, and the equal scope thereof.

For example, it is possible to combine the second and eighth embodiments to obtain a configuration in which the inside of the light guide section is constructed of a medium and a pump is used as a supply source of the cooling water. Further, although the cooling water supplying hose 9 or the like is used as a supplying path of the cooling water, a non-flexible metal pipe or a combination of the cooling water supplying hose 9 or the like and metal pipe may be used as the cooling water supplying path. Further, to make the environment isolation container 2 watertight, it is possible to select preferable means such as an O-ring, a packing, a gasket, an adhesive, a weld, and a cable connector.

Although the light guide section 5 is shaped of L-shape in the above embodiments, the L-shape is taken as a preferred example employed in the case where the CRD housings 102 is machined, and the light guide section 5 may have any shape depending on the situation such as the machining position or the arrangement space.

Further, although the reactor filled with reactor water is taken as an example of an underwater environment where a cooling water supplying path of the laser oscillator is long and environmental temperature of the supplying path is not maintained constant, the application of present invention is not limited to the reactor. For example, the present invention may be applied to a structure such as a ship and a bridge.

Further, although the laser irradiation apparatus that performs laser peening has been described in each of the embodiments, it is possible to use any laser apparatus as long as it has a laser oscillator in water and, for example, the present invention may be applied to a laser apparatus that performs machining such as repair or the like using cladding by welding.

The invention claimed is:

1. A laser irradiation apparatus disposed in water and performing maintenance/repair using a laser, the apparatus comprising:
   an environment isolation container configured to be disposed in a maintenance/repair object provided with water inside;
   a laser oscillator provided inside the environmental isolation container, the laser oscillator being configured to be isolated from the water in the maintenance/repair object via the environmental isolation container;
   a laser irradiation head which collects laser light and irradiates a part to be machined with the laser light;
   a light guide section which transmits the laser light from the laser oscillator to the laser irradiation head;
   a power supply apparatus which supplies the laser oscillator with power;
   an air-chamber partition for dividing inner space of the environment isolation container into a first space in which the laser oscillator and a path of the laser light are disposed, and a second space outside the first space;
   a pipe communicating the second space with the laser oscillator;
   a cooling water supplying apparatus which supplies the laser oscillator with cooling water through a cooling water supplying path; and
   a temperature sensor which measures temperature inside the environment isolation container, wherein
   at least one of temperature and flow rate of the cooling water to be supplied from the cooling water supplying apparatus is controlled based on measurement result obtained from the temperature sensor; and
   the cooling water supplied from the cooling water supplying apparatus passes through the laser oscillator and is then supplied to the second space through the pipe.

2. The laser irradiation apparatus according to claim 1, wherein
   at least a part of a portion through which the laser light passes in the light guide section is constructed of a transparent medium.

3. A laser machining method, comprising:
   preparing an object to be machined to be provided with water inside;
   preparing a laser oscillator provided inside an environmental isolation container, the laser oscillator being configured to be isolated from the water in the object via the environmental isolation container, and wherein an inner space of the environmental isolation container is divided into a first space in which the laser oscillator and a path of laser light are disposed, and a second space outside the first space by an air-chamber partition;
   preparing a pipe communicating the second space with the laser oscillator, wherein the cooling water supplied from the cooling water supplying apparatus passes through the laser oscillator and is then supplied to the second space through the pipe;
   providing the environmental isolation container in the water inside the object;
   performing machining by irradiating the laser light from the laser oscillator to a part of the object with supplying cooling water to the laser oscillator;
   measuring temperature inside the environment isolation container with use of a temperature sensor, and;
   controlling at least one of temperature and flow rate of the cooling water to be supplied to the laser oscillator based on measurement result of the temperature sensor.

* * * * *